United States Patent
Moody

[11] Patent Number: 5,964,018
[45] Date of Patent: Oct. 12, 1999

[54] BELT REPAIR SYSTEM AND METHOD

[75] Inventor: Paul E. Moody, Barrington, R.I.

[73] Assignee: The United States of America as represented by the Secretary of the Navy, Washington, D.C.

[21] Appl. No.: 08/919,185

[22] Filed: Aug. 15, 1997

[51] Int. Cl.⁶ ..................................... B23P 6/00
[52] U.S. Cl. ..................... 29/402.09; 474/256; 24/31 B; 24/31 C; 24/35
[58] Field of Search ............................ 29/402.09, 402.11, 29/402.18; 474/253, 255, 256; 408/16, 72 B; 24/31 B, 31 C, 38, 35

[56] References Cited

U.S. PATENT DOCUMENTS

| | | | |
|---|---|---|---|
| 1,330,239 | 2/1920 | Chantrell | 24/38 |
| 3,722,130 | 3/1973 | Handl | 24/31 C |
| 3,788,156 | 1/1974 | Jackson | 74/238 |
| 4,336,021 | 6/1982 | Haines | 24/35 |
| 4,795,410 | 1/1989 | Alderfer | 474/256 |
| 5,017,182 | 5/1991 | Mabie | 474/256 |
| 5,073,155 | 12/1991 | Mabie | 474/256 |

Primary Examiner—David P. Bryant
Assistant Examiner—Jermie E. Cozart
Attorney, Agent, or Firm—Michael J. McGowan; James M. Kasischke; Prithvi C. Lall

[57] ABSTRACT

A belt repair system and method is used to repair a broken belt, such as a drive belt. The belt repair system includes one or more belt couplers having first and second body portions with belt engaging members. The body portions of each belt coupler extend within the broken belt at respective first and second broken ends so that the respective belt engaging members engage with engaging regions within the broken belt at the first and second broken ends. The belt repair method includes providing an indication on the broken ends of the broken belt of the location of the engaging regions, forming the engaging regions within the broken belt at the indicated location and inserting the body portions of the belt coupler into the respective engaging regions of the broken belt at the respective broken ends. An optional adhesive or bonding material can be placed between the broken ends to strengthen the coupling of the broken belt.

5 Claims, 4 Drawing Sheets

BELT REPAIR SYSTEM AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention features a system for coupling first and second ends of a belt and in particular, to a belt repair system and method that uses a novel belt coupler to couple first and second broken ends of a broken belt.

(2) Description of the Prior Art

Many types of equipment and vehicles require the use of belts, such as endless elastomeric drive belts, fan belts, and the like. Typical drive belts are subject to failure after prolonged use, as a result of wear or aging of the material of the drive belt. One common type of belt is made of rubber that becomes brittle as the rubber ages, thereby resulting in an unanticipated failure of the belt and the inability to use the vehicle or equipment in which it is used.

Automobiles as well as other vehicles, machines, or tools regularly use flexible drive belts for connecting portions of their drive systems. Failure of a drive belt can have a detrimental effect on the equipment, machinery or vehicle in which the drive belt is used, often resulting in a breakdown of the vehicle or machine. A failure of a fan belt in an automobile, for example, results in the failure of the connected water pump and cooling fans, causing the engine to overheat and requiring the engine to be shut down. Other similar drive belts are used on vehicle generators and power steering units for providing important auxiliary functions in vehicles. Use of a vehicle without these belts is difficult and usually impossible. Other mechanical systems, such as machine tools, refrigerating systems and the like, also include essential drive belts which fail from time to time, causing serious problems until they are replaced.

When a drive belt breaks, the ideal situation would be to have available a new drive belt of the same size and type. Frequently, however, storage facilities, such as service stations, do not have the proper size and type of belt. Moreover, the breakdown could take place in a remote location where no replacement belts are available.

One solution might be to carry enough replacement belts of the various sizes and types with the vehicle or equipment itself. However, this could require a large number of different types and sizes of belts. Other emergency belt kits provide a replacement belt that can be cut to a desired size and then coupled using a belt coupler. Such kits, however, require the entire broken belt to be replaced with a tubular belt that receives the belt coupler. These systems are undesirable because they require storage for both the replacement belts as well as the belt couplers. Another drawback of these emergency belt kits is that, although the length can be varied, the shape or type of the replacement belt might not match that of the broken belt. Thus, replacement belt might not function properly when used in place of the broken belt.

SUMMARY OF THE INVENTION

Accordingly, one object of the present invention is to provide a system and method for repairing a broken belt without requiring replacement of the broken belt.

Another object of the present invention is to provide a system and method for repairing a broken belt that can be used with any size or type of belt.

A further object of the present invention is a system and method for repairing a broken belt that is simple and inexpensive yet securely holds during operation of the equipment, machinery or vehicle.

The present invention features a method of repairing at least one broken belt having first and second broken ends. The method includes providing at least one belt coupler which is an elongated member having a first body portion and a second body portion extending from a central region, and at least one belt engaging member on each of the first and second body portions. Next, the first body portion is inserted into the first broken end engaging region within the broken belt at the first broken end. The belt engaging member on the first body portion engages with the first broken end engaging region within the broken belt. The same steps are performed with the second body portion and the second broken end.

This method may also include forming the broken end engaging regions within the broken belt at the first and second broken ends. This can be done by drilling one hole in each end of the broken belt. To assure accuracy, this method includes the steps of providing an indication of a location of broken end engaging regions and forming the broken end engaging regions at the indicated location. This indication can be performed by matching and holding together the broken ends, marking reference lines along a central region of a top and side surface of the broken ends, and extending the reference lines along the broken ends of the belt to form a reference marking. After this is done, holes can be drilled at the reference markings. Furthermore, adhesive can be applied to the broken ends to bond the ends together.

The present invention also features a belt repair system for repairing at least one broken belt. A means such as a drill forming engaging regions in the broken ends can be provided. At least one belt coupler is provided for insertion into the engaging regions and for coupling the broken ends.

According to the preferred embodiment, the belt repair system can further include a means for marking a location of the broken end engaging regions to be formed in the broken belt. An adhesive for bonding the broken ends together can be provided.

BRIEF DESCRIPTION OF THE DRAWINGS

These and other features and advantages of the present invention will be better understood in view of the following description of the invention taken together with the drawings wherein.

DETAILED DESCRIPTION OF THE PREFERRED EMBODIMENT

Figure 1:
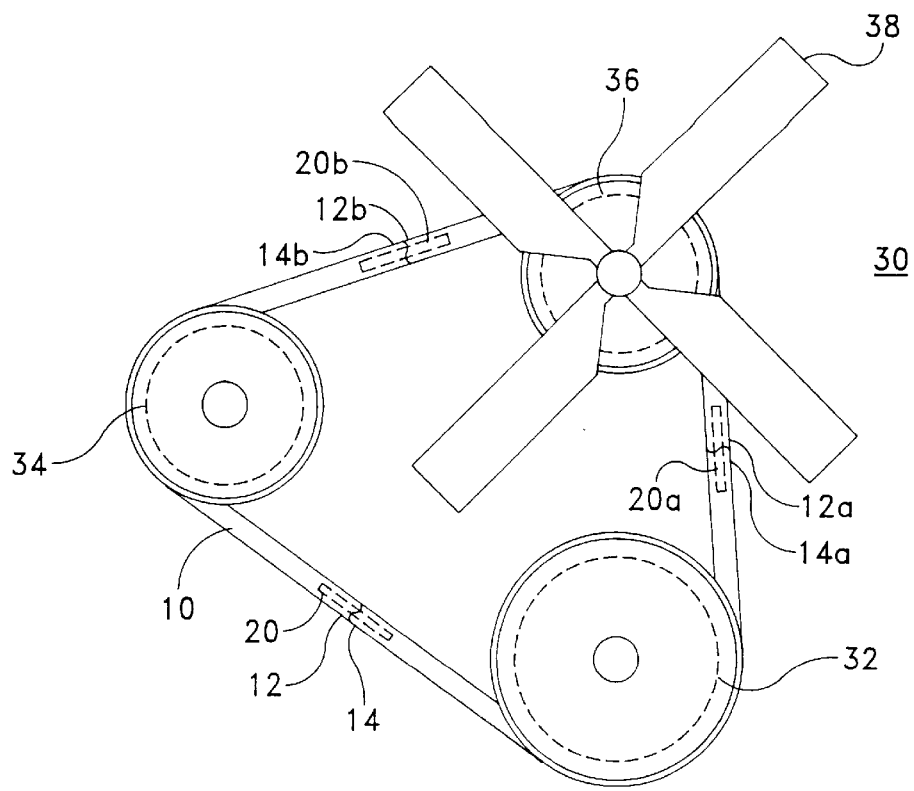
FIG. 1 is a front view of a belt driven mechanism having a belt repaired by the belt repair system and method of the present invention.

The belt repair system and method according to the present invention is used to repair a broken belt 10, FIG. 1, having at least first and second broken ends 12, 14. The belt repair system includes one or more belt couplers 20 extending within the broken belt 10 proximate the first and second broken ends 12, 14. The belt repair system and method can be used to repair belts, such as flexible drive belts, on automobiles, machines, tools, or any type of vehicle or equipment on which a drive belt is used. The broken belt 10 is typically a flexible belt made of a solid elastomeric material such as rubber.

In the exemplary embodiment shown in FIG. 1, the belt repair system and method is used to repair a broken belt 10 used on a fan belt assembly 30 having a number of pulleys 32, 34 and 36 and a fan 38. The present invention, however, contemplates any size or type of belt used in any type of assembly, vehicle, machinery, or other types of equipment. Additional belt couplers 20a, 20b can be used to couple additional broken ends 12a, 14a, 12b, 14b, respectively, as needed to repair the broken belt 10.

Figure 2:
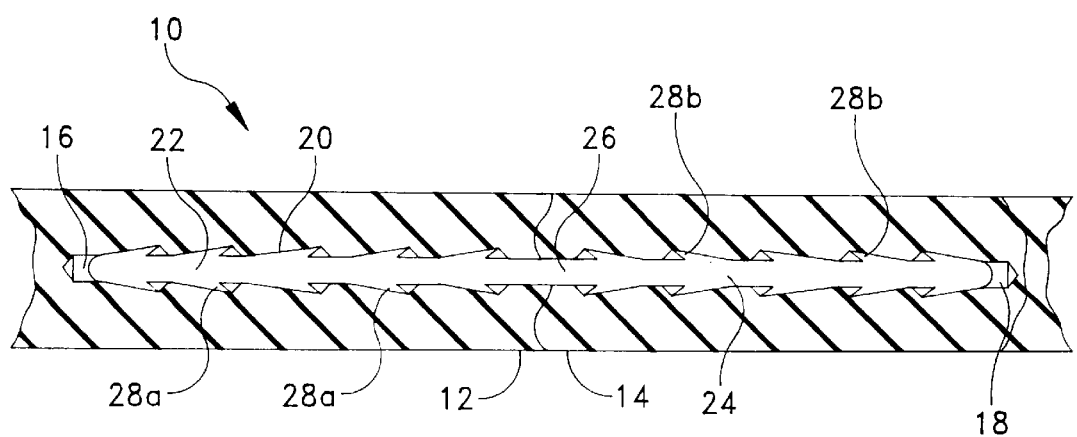
FIG. 2 is a cross-sectional view of first and second broken ends coupled together according to the belt repair system and method of the present invention.

Each belt coupler 20, FIG. 2, engages a first broken end engaging region 16 and a second broken end engaging region 18 formed within the broken belt 10 at the first and second broken ends 12, 14. The broken belt 10 is typically a flexible belt, for example, made of an elastomeric material such as rubber. The first broken end engaging region 16 and second broken end engaging region 18 are preferably formed at a substantially central location within the broken belt 10 by using a tool, such as a drill, as will be described in greater detail below.

The belt coupler 20 preferably includes an elongated member having a first body portion 22 and a second body portion 24 extending from a central region 26 and is preferably made of a rigid material, such as metal or plastic. The belt coupler 20 further includes one or more belt engaging members 28a disposed along the first body portion 22 and one or more belt engaging members 28b disposed along the second body portion 24. The belt engaging members 28a on the first body portion 22 engage with the first broken end engaging region 16 when the first body portion 22 is inserted into the first broken end engaging region 16. The belt engaging member 28b disposed on the second body portion 24 is engaged with the second broken end engaging region 18 when the second body portion 24 is inserted within the second broken end engaging region 18.

Figure 3:
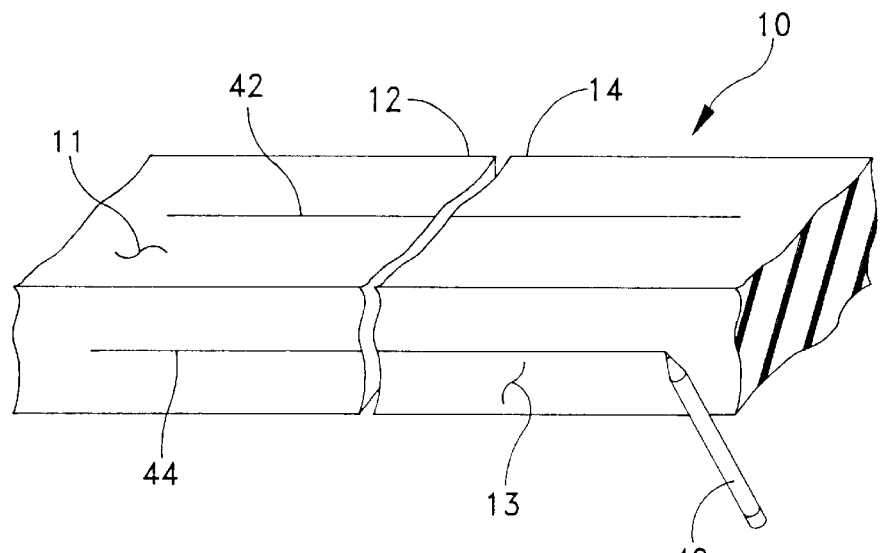
FIG. 3 is a perspective view of first and second broken ends of a broken belt being marked according to the preferred belt repair method of the present invention.

According to the preferred belt repair system and method, the first and second broken ends 12, 14, FIG. 3, of the broken belt 10 are marked with reference lines 42, 44 to provide an indication of the location of the engaging regions that are to receive and engage the belt coupler. A marking instrument 40, such as a pen, pencil, sharp object, or other type of instrument capable of marking some form of indication on the belt, is used to mark the reference lines 42, 44 substantially along the central region of the broken belt 10.

The first and second broken ends 12, 14 are matched together as if in a pre-broken position. The first and second broken ends 12, 14 are held together while the marking instrument 40 is used to mark at least one reference line 42 along the central region of a top surface 11 of the broken belt 10 proximate the first and second broken ends 12, 14. At least one reference line 44 is also marked along a central region of a side surface 13 proximate the broken ends 12, 14 of the broken belt 10. The present invention contemplates more or less markings or reference lines as needed.

Figure 4:
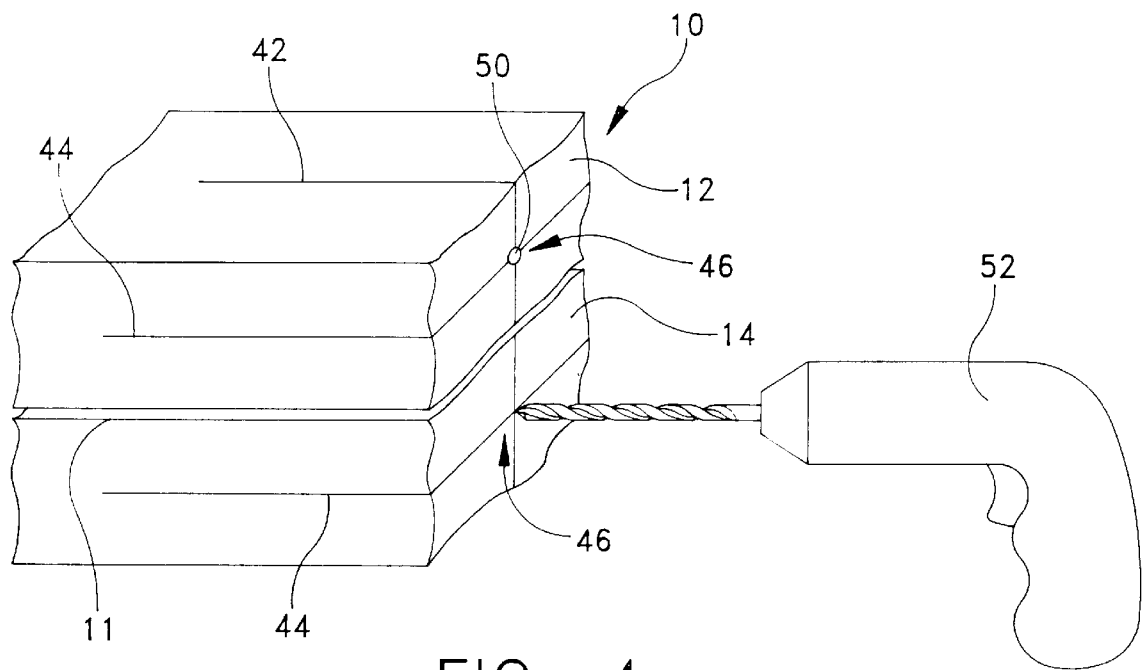
FIG. 4 is a perspective view of first and second broken ends of a broken belt having an internal region being formed according to the preferred belt repair method of the present invention.

The reference lines 42, 44, FIG. 4, are then continued or extended across the first and second broken ends 12, 14 to form a reference marking or cross 46 on each of the first and second broken ends 12, 14. The first and second broken ends 12, 14 are preferably held together side by side as the marking instrument 40 is used to extend the reference lines 42, 44 across the first and second broken ends 12, 14. The reference cross 46 provides an indication of where the first and second broken end engaging regions 16, 18 are to be formed.

One way of forming the first and second broken end engaging regions 16, 18 is to form a hole 50 in the broken belt 10 at the reference marking or cross 46 on each of the first and second broken ends 12, 14. In one example, a drill 52, such as a portable or hand held drill, can be used. The present invention contemplates other mechanisms or devices for forming the hole 50 including, but not limited to, a nail, a punch or other device capable of forming a hole in belt ends 12, 14. The drill 52 or other hole forming device can be battery powered, powered by the cigarette lighter, or powered by directly connecting to the vehicle battery.

Figure 5:
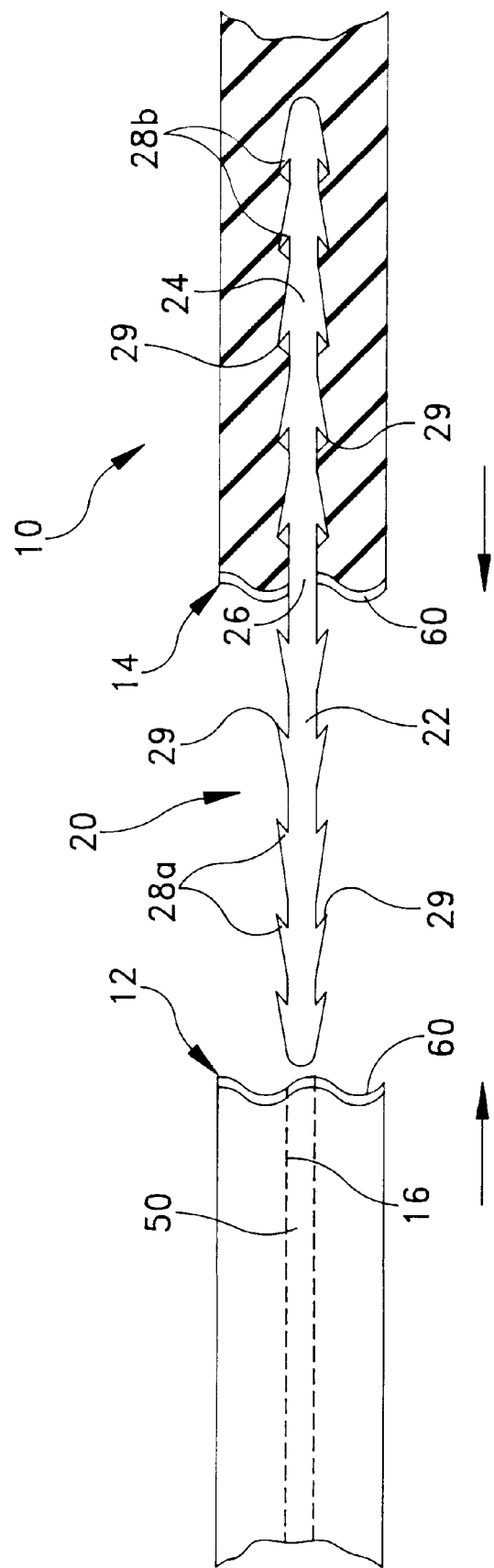
FIG. 5 is a partial cross-sectional view of first and second ends being coupled together according to the preferred belt repair method of the present invention.

The size of the holes 50, FIG. 5, will depend upon the size of the belt coupler 20 used to repair the broken belt 10. The length of each hole 50 is preferably slightly longer than each first and second body portion 22, 24 of the belt coupler 20 to be inserted in the hole 50. The diameter of each hole 50 should be large enough to allow the respective first and second body portions 22, 24 of the belt coupler 20 to be inserted into the respective hole 50 and small enough to allow the one or more belt engaging members 28a, 28b to engage with the wall of the engaging regions 16, 18 within the holes 50. Although numerous sizes of belts can be repaired with a single size belt coupler 20, the present invention contemplates belt couplers 20 of various sizes to be used with belts of various sizes.

After the holes 50 have been formed within the broken belt 10 at the first and second broken ends 12, 14, one of the body portions 22, 24 of the belt coupler 20 is inserted into the hole 50 at one of the broken ends 12, 14. After one of the body portions 22, 24 is inserted into the respective hole 50 at the respective broken end 12, 14, the other broken end 12, 14 is coupled with the other body portions 22, 24 of the belt coupler 20 until the first and second broken ends 12, 14 are moved together.

According to the preferred embodiment of the belt coupler 20, the belt engaging members 28a, 28b include pointed edges 29 that bite or dig into the material of the broken belt 10 within the engaging regions 16, 18. The belt engaging members 28a, 28b are preferably arranged at an angle with respect to the first and second body portions 22, 24 of the belt coupler 20, so that the pointed edges 29 point toward the central portion 26 of the belt coupler 20. This orientation of the pointed edges 29 facilitates the biting of the pointed edges 29 into the material of the broken belt 10 and prevents the belt coupler 20 from being removed.

According to one alternative, the belt repair system and method further includes providing an adhesive or bonding material 60 on one or both of the first and second broken ends 12, 14 to form a bond between the first and second broken ends 12, 14 and provide additional strength to the repaired broken belt 10. Examples of the types of adhesive or bonding material 60 that can be used include, but are not limited to, rubber or epoxy cement.

Figure 6:
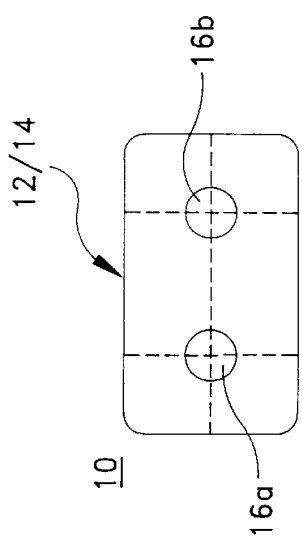
FIG. 6 is a side view of a broken end of a broken belt having first and second internal regions formed therein according to a further embodiment of the present invention.

According to a further embodiment of the belt repair system and method, a broken belt 10, FIG. 6, can include two or more engaging regions 16a, 16b, such as holes, formed in each end 12, 14 of the broken belt 10 depending upon the size of the broken belt 10. The two or more engaging regions 16a, 16b can be formed using the method described above.

Figure 7:
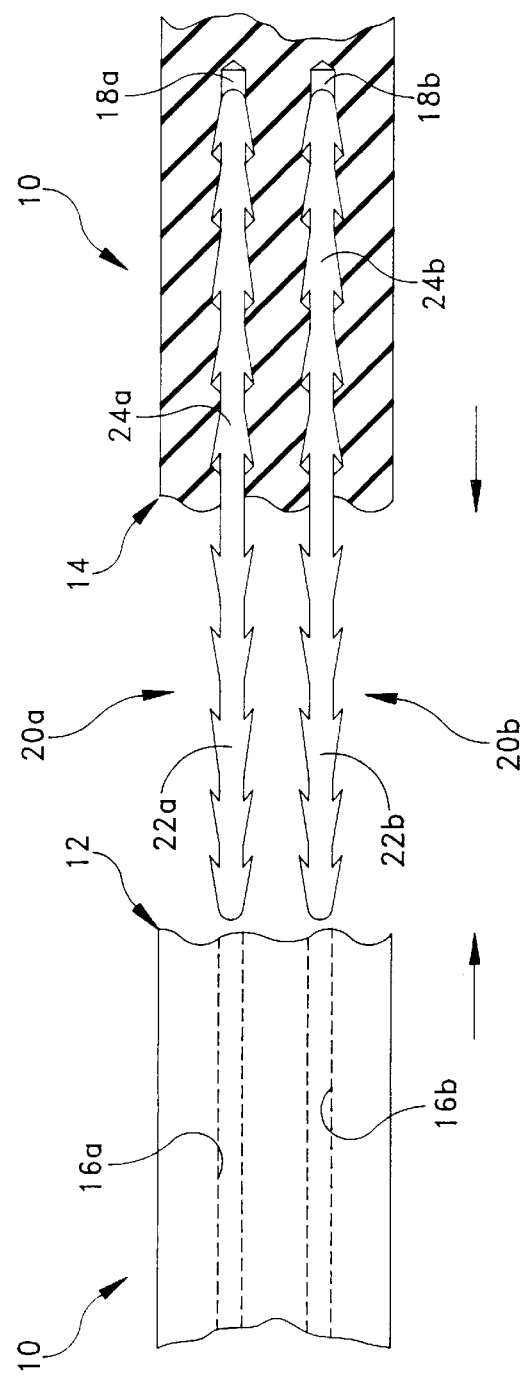
FIG. 7 is a partial cross-sectional view of first and second broken ends of a broken belt being coupled together according to a further method of the present invention.

The two or more engaging regions 16a, 16b, FIG. 7, receive and engage two or more belt couplers 20a, 20b. One body portion 24a, 24b of each belt coupler 20a, 20b is first inserted into respective first and second first broken end engaging regions 18a, 18b in the broken belt 10 at one broken end 14. The other body portion 22a, 22b of each belt coupler is then inserted into respective first and second broken end engaging regions 16a, 16b in the broken belt 10 at the other broken end 12. The two or more belts couplers 20a, 20b are used, depending upon the size of the broken belt, to increase the strength of the coupling.

Accordingly, the belt repair system and method of the present invention allows the existing belt to be easily and effectively repaired and avoids having to replace the belt entirely. The belt repair system and method allows various sizes of belts to be repaired without having to maintain a supply of replacement belts corresponding to numerous sizes.

In light of the above, it is therefore understood that within the scope of the appended claims, the invention may be practiced otherwise than as specifically described.

What is claimed is:

1. A method of repairing at least one broken belt having at least first and second broken ends, said method comprising the steps of:

providing at least one belt coupler comprising an elongated member having first and second body portions extending from a central region, and having at least one belt engaging member on each of said first and second body portions;

providing an indication of a location at least one first broken end engaging region and at least one second broken end engaging region on said at least first and second broken ends of said at least one broken belt, respectively by matching and holding together said at least first and second broken ends of said at least one broken belt, marking reference lines along a central region of at least a top and side surface of said at least first and second broken ends while held together, and extending said reference lines along said at least first and second broken ends of said at least one broken belt to form at least one reference marking on each of said at least first and second broken ends;

forming said at least one first broken end engaging region and said at least one second broken end engaging region at said indication of said location of said at least one first broken end engaging region and said at least one second broken end engaging region on said at least first and second broken ends of said at least one broken belt for inserting said first and second body portions therein;

inserting said first body portion in a substantially longitudinal manner into said at least one broken belt at said first broken end, wherein said at least one belt engaging member on said first body portion engages within said first broken end engaging region; and inserting said second body portion in a substantially longitudinal manner into said at least one broken belt at said second broken end, wherein said at least one belt engaging member on said second body portion engages within said second broken end engaging region.

2. The method of claim 1 wherein said step of forming said at least one first broken end engaging region and said at least one second broken end engaging region includes drilling holes in said at least one broken belt at said at least one reference marking on each of said at least first and second broken ends, respectively.

3. The method of claim 1 further including the steps of:

applying an adhesive to at least one of said first broken end and said second broken end of said at least one broken belt; and placing said first broken end in contact with said second broken end for bonding together said broken ends after inserting said first body portion and said second body portion.

4. The method of claim 1 wherein said step of providing said at least one belt coupler includes:

providing at least first and second belt couplers;

said step of inserting said first body portion includes inserting a first body portion of each of said at least first and second belt couplers into said first broken end; and wherein said step of inserting said second body portion includes inserting a second body portion of each of said at least first and second belt couplers into said second broken end.

5. The method of claim 1 wherein said at least one belt coupler includes a plurality of belt engaging members on each of said first body portion and said second body portion.

* * * * *